United States Patent
Hawkins et al.

[11] 3,718,963
[45] March 6, 1973

[54] METHOD AND APPARATUS FOR REMOVING SCREEN WIRE MEMBERS FROM MULTI-LEVEL SCREEN DECK ASSEMBLIES

[76] Inventors: George C. Hawkins, 9636 North Riverside Drive, Mequon, Wis. 53092; James H. Cutts, 5450 North Long Island Drive, Milwaukee, Wis. 53209

[22] Filed: Nov. 25, 1970

[21] Appl. No.: 92,763

[52] U.S. Cl. ............... 29/200 D, 29/200 H, 29/270, 209/405, 209/403
[51] Int. Cl. ............................................. B23p 19/00
[58] Field of Search.................. 29/207.5 SL, 270, 278, 207.5 D, 29/207.5 R, 207.5 ST, 426, 200 D, 200 H, 203 H, 242, 270; 209/233, 409, 410, 399, 408, 412, 403-405; 16/114 R, 110 R

[56] References Cited

UNITED STATES PATENTS

| | | | |
|---|---|---|---|
| 2,131,687 | 9/1938 | Kaplan | 29/278 |
| 2,770,032 | 11/1956 | Kelly | 29/270 |
| 3,137,065 | 6/1964 | Harris | 29/278 |
| 3,583,744 | 6/1971 | Paine | 29/278 |
| 3,617,083 | 11/1971 | Koppensteiner | 29/278 |
| 1,713,144 | 5/1929 | Overstrom | 209/403 |
| 2,630,225 | 3/1953 | Bye | 209/403 |
| 2,772,440 | 12/1956 | Applegate | 16/114 R |
| 2,274,700 | 3/1942 | Jenks | 209/403 |
| 2,599,434 | 6/1952 | Crane | 16/114 R |
| 3,346,114 | 10/1967 | Hoyt | 209/403 |
| 3,374,888 | 3/1968 | Volpert et al. | 209/403 |
| 3,666,277 | 5/1972 | Hubach et al. | 209/408 |
| 2,975,900 | 3/1961 | Hoffman | 209/403 |

Primary Examiner—Charles W. Lanham
Assistant Examiner—D. C. Crane
Attorney—John W. Michael, Gerrit D. Foster, Bayard H. Michael, Paul R. Puerner, Joseph A. Gemignani, Robert E. Clemency, Andrew O. Riteris, Glenn A. Buse and Spencer B. Michael

[57] ABSTRACT

The screen wire members are removed by first loosening the nuts on the clamp bar holding bolts and then moving the bolts axially inwardly to thereby move the clamp bars to a non-holding position. This is accomplished by the use of a plurality of clamp bar tools which are fastened to the ends of pairs of vertically spaced bolts, the lower of which is at the level where the screen wire member is to be removed and the upper of which is at the next higher level of the multi-screen deck assembly.

4 Claims, 3 Drawing Figures

PATENTED MAR 6 1973  3,718,963

Inventors
George C. Hawkins
James H. Cutts
By Paul R. Puerner
Attorney

METHOD AND APPARATUS FOR REMOVING SCREEN WIRE MEMBERS FROM MULTI-LEVEL SCREEN DECK ASSEMBLIES

BACKGROUND OF INVENTION

Prior methods for removal of screen wire members have generally required several workmen to perform the job. In addition, the equipment utilized was relatively complex and expensive requiring, in some instances substantial modification of the existing structure.

The principal object of this invention is to provide an improved method and apparatus wherein a single workman can efficiently do the job. A further object is to provide a method and apparatus which utilizes a relatively simple and inexpensive clamp bar tool requiring a minimum of modification to existing structures for its use.

SUMMARY OF INVENTION

The method of this invention relates to the removal of a screen wire member from a multi-level screen deck assembly in which each of the screen wire members are held in place by a holding assembly including a pair of clamp bars and a plurality of bolts extending through each clamp bar in the side of the screen box with the bolts having a holding and a locking nut threaded on the external ends thereof to clamp the parts in operating position.

The steps of the method include removal of the lock nuts from four bolts at the level at which it is desired to remove a screen wire member with the nuts being removed from two bolts in one clamp bar and from two bolts in the other clamp bar. Next, the lock nuts are removed from four bolts at the next highest level, said nuts being removed from the bolts located directly above the bolts referred to above. The next step is to loosen all remaining lock nuts and all holding nuts about 2 inches on the bolts in the clamp bars holding the screen wire member in place. Next, an inward axial movement is imparted to the bolts from which the lock nuts have been removed which, in turn, provides an inward and upward movement to the clamp bars to thereby move them to a non-holding position. This step is facilitated by the use of a clamp bar tool having pairs of vertically spaced openings which are adapted to fit over the ends of the vertically spaced bolts from which the lock nuts have been removed. Axial movement to the lower bolts is provided by reinstalling the lock nuts over the ends of the clamp bar tool and tightening them snugly in place. The final step is simply to remove the screen wire member out from under the clamp bars which have been moved to a non-holding position.

DESCRIPTION OF DRAWINGS

FIG. 1 is a fragmentary end elevation view of a typical multi-screen deck assembly of the type the present invention is designed to be used with;

DESCRIPTION OF PREFERRED EMBODIMENT

Figure 1:
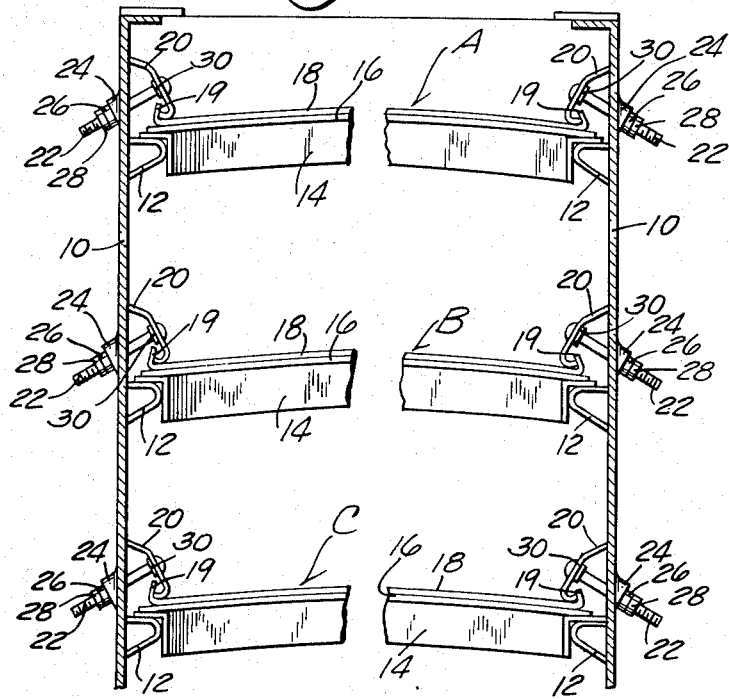

Referring now to the drawings in detail, FIG. 1 shows a typical multi-screen deck assembly of the type with which the present invention is designed to be used. Such assembly is comprised of a screen box 10 in which a plurality of screen wire support assemblies are mounted. The number of such screen wire support assemblies in any particular unit will vary. In the structure shown in FIG. 1 there are three such assemblies labeled A, B and C.

Each screen wire support assembly or deck is comprised of a pair of oppositely facing elongated support bars 12,12 fastened to the inside wall of the screen box by welding or other suitable means. Supported on support bars 12,12 are screen frame members 14 on top of which are supported a sub-screen member 16 which in turn supports a screen wire member 18.

Figure 2:
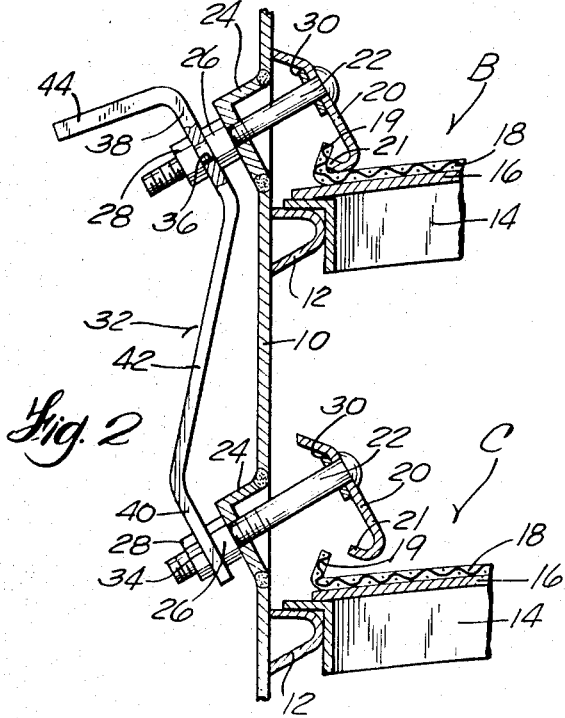
FIG. 2 is an enlarged fragmentary end elevation view showing the screen wire removal tool of the present invention in its operative position.

Each of screen wire assemblies A, B and C are held securely in place by a pair of elongated clamp bars 20, 20. The clamp bars are mounted on a plurality of carriage bolts 22 which in turn are mounted in and extend through a plurality of clamp lugs 24 welded or otherwise fastened to the outer surface of the screen box. As most clearly shown in FIG. 2, lugs 24 are mounted at openings 25 in the sides of screen box 10 so that bolts 22 will extend from the interior to the exterior of the screen box. Threaded on each carriage bolt 22 are pairs of holding and locking nuts 26 and 28, respectively. For reasons which will be explained in detail hereinafter, axial movement of bolts 22 with respect to clamp bars 20 is restrained by any suitable means such as a washer 30 welded or otherwise fastened to each bolt. Also as best shown in FIG. 2, screen wire members 18 have small upwardly extending lips 19 which cooperate with lips 21 on clamp bars 20 to securely hold the parts in operating position.

Figure 3:
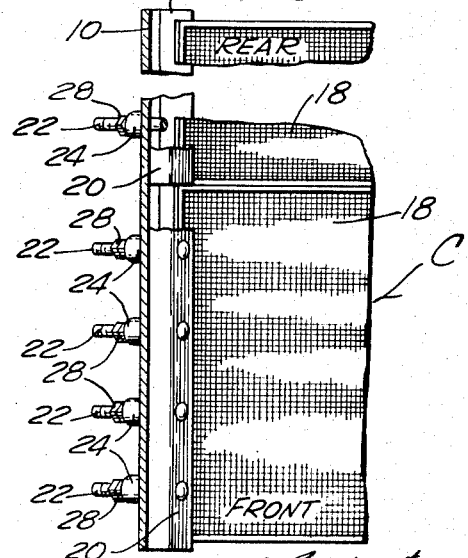
FIG. 3 is a view taken along line 3—3 of FIG. 1 with certain parts broken away.

As shown in FIG. 3, each deck assembly A, B and C includes a pair of screen wire members 18 positioned end to end with each of the two screen wire members being secured in operative position by a pair of clamp bars 20. Thus, at each deck level there are two screen wire members 18 and four clamp bars 20. For purposes of explanation the two screen wire members 18, as shown in FIG. 3, are labeled FRONT and REAR. Also as shown in FIG. 2, the present invention contemplates the use of a clamp bar tool 32 which is made of substantially rigid material such as steel. Tool 32 is shaped somewhat like a question mark and is provided with spaced openings 34 and 36 for purposes to be described in detail hereinafter. Tool 32 is comprised of upper and lower clamping faces 38 and 40 rigidly connected together by a bar member 42 formed integrally with face portions 38 and 40. Opening 34 is located in face portion 40 and opening 36 is located in face portion 38. The planes of face portions 40 and 38 extend substantially parallel with each other. Face portion 38 is provided with a bar-like extension 44 formed integrally therewith which serves primarily as a handle for manipulation of the clamp bar tool.

As indicated previously, the above described structure is designed for screening of aggregate material wherein the material is deposited from the top onto deck A and is subsequently screened from deck A to deck B and then to deck C by a vibratory action imparted to the entire assembly. The mesh of the screen wire members 18 becomes subsequently smaller from the top to the bottom of the unit so that the coarser aggregate is taken off at deck A, less coarse aggregate at deck B and so on down through the assembly. Since the details of the vibratory means, the screens themselves, the screen box and the aggregate handling apparatus are not material to an explanation of the present invention, such details are not shown or described herein.

As indicated previously, this invention is specifically related to the requirement for periodic removal of the screen wire members 18 for replacement and/or repair.

In the use of the present invention, the steps employed for removal of a screen wire 18 are as follows. The description which follows will specifically relate to the removal of the FRONT screen wire member 18 from the deck C assembly.

1. Remove lock nuts 28 from four of the carriage bolts 22, two on each side of FRONT screen wire member 18. While the particular carriage bolts from which lock nuts 28 are removed can vary somewhat, it is the usual practice to remove nuts 28 at the four bolts located at the ends of the two clamp bars holding FRONT screen wire member 18. 2. Remove lock nuts 28 from the four carriage bolts 28 at deck level B from the bolts located directly above the bolts from which the nuts 28 were removed at level C in step (1) above. 3. Loosen all remaining lock nuts 28 and all nuts 26 about 2 inches on all bolts 22 holding the FRONT screen wire member 18. 4. Install four clamp bar tools 32 on the ends of carriage bolts 22 at decks C and B from which lock nuts 28 have been removed in steps (1) and (2) above. As shown in FIG. 2, tools 32 are installed so that the bolts at deck C extend through openings 34 and the bolts at deck B extend through openings 36 in the respective tools 32. 5. Reinstall lock nuts 28 on the bolts on which clamp bar tools 32 have been installed and tighten them up snugly. As shown in FIG. 2, such tightening of the lock nuts will cause the bolts 22 at deck C to be forced to move axially inwardly which in turn will cause the clamp bars at deck C to move slightly upwardly and inwardly to the position shown in FIG. 2. 6. With the parts in the FIG. 2 position, the FRONT screen wire member 18 at deck C can be easily removed by one man by simply pulling it in the direction shown by the arrow in FIG. 3. 7. After a replacement screen wire member 18 is installed, clamp bar tools are removed and nuts 26 and 28 are tightened up to their original positions.

The rear screen wire member 18 at level C can then be replaced by following the same sequence of steps as described above. After both screen wire members at level C have been replaced, the screen wire members at level B can be replaced by following the steps outlined above but using the screen wire tool between levels B and A. Since the screen wire members at level A are exposed from the top, they can be easily removed from the top by simply loosening up the nuts on the bolts at level A, there being no need for the special clamp bar tool 32 as utilized at levels B and C.

From the foregoing description it will be appreciated that the method and apparatus of this invention provides a simple and inexpensive arrangement for removal and replacement of screen wire members 18. Of particular importance is the fact that the entire operation can be performed by a single worker resulting in substantial savings in labor expense as compared with most previous methods.

We claim:

1. Apparatus for removing a screen wire member from a multi-level screen deck assembly in which each of said screen wire members is held in place by a holding assembly including a pair of clamping bars and a plurality of bolts extending through said clamp bars and a side of the screen box, said bolts having a holding means mounted on the external ends thereof comprising:

a plurality of clamp bar tools each having an upper and lower face portion rigidly held together by a connector bar member, said upper and lower face portions each having an opening therein, said openings adapted to receive the ends of a pair of vertically spaced clamp bar holding bolts at two successive levels of said multi-level screen deck assembly; and a restraining means to prevent axial movement of said spaced clamp bar holding bolts relative to said clamp bars.

2. Apparatus according to claim 1 in which the planes of said upper and lower face portions are in substantially spaced parallel relationship with each other.

3. Apparatus according to claim 1 in which said face portions and connector bar member are formed integrally with each other.

4. Apparatus according to claim 1 in which said upper face portion has a handle member fastened thereto and extending substantially at right angles therefrom.

* * * * *